March 7, 1950     H. J. KUHLMAN     2,499,654
BRACKET AND SUPPORTING ATTACHMENT FOR TRACTORS
Filed Oct. 26, 1946
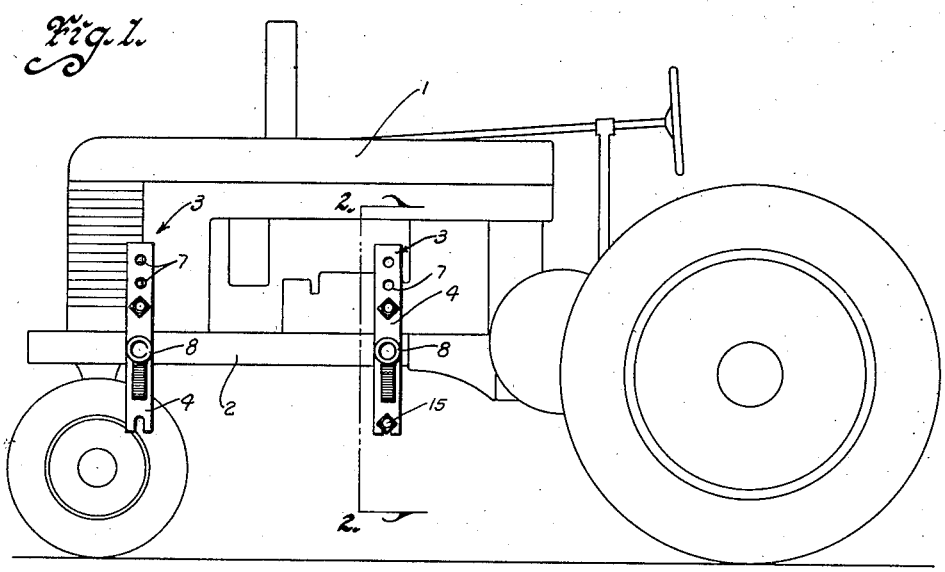
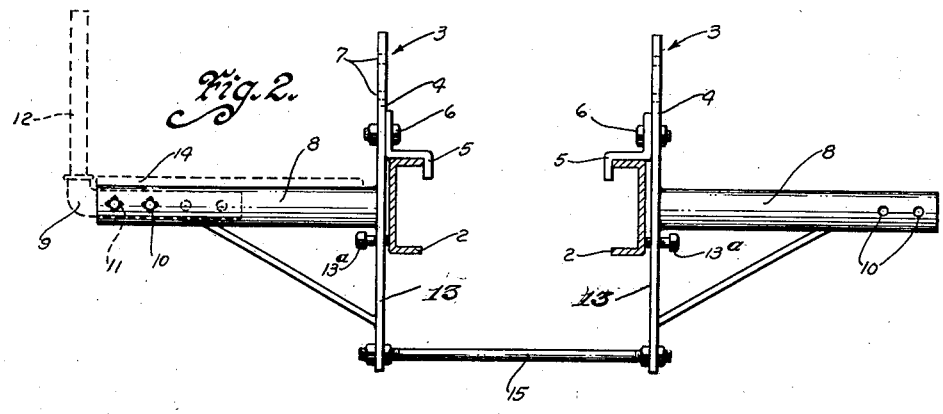
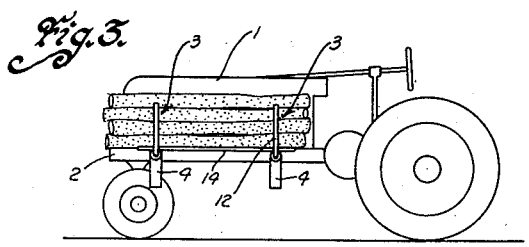
Inventor
Henry J. Kuhlman
by Harry L. Yinger
Attorney
Witness
Edward P. Feeley Patented Mar. 7, 1950

2,499,654

UNITED STATES PATENT OFFICE 2,499,654

BRACKET AND SUPPORTING ATTACHMENT FOR TRACTORS

Henry J. Kuhlman, Waterloo, Iowa

Application October 26, 1946, Serial No. 706,019

1 Claim. (Cl. 224—42.43)

This invention relates to a bracket and supporting attachment for tractors and more particularly to an attachment for a tractor that allows the tractor to be used for transporting different articles; or more or less as a wagon or truck and as a supporting means for different farm implements.

A farm tractor is primarily used as a motive power means for propelling farm implements such as plows, discs, harrows, etc., and if used for hauling purposes, the tractor is the motive power means while a trailer is attached to the back of the tractor and towed. There are numerous times and opportunities where it is inconvenient to attach a trailer or wagon to the back of the tractor and it would be desirable if the tractor itself had some supporting means for transporting materials. Fence posts could be carried on the side of the tractor if a suitable attachment were available; foldable harrows could be transported right on the tractor thus eliminating use of a trailer; lumber could be moved from place to place around a farm and many unknown uses could be found for a tractor with some sort of supporting attachment added.

An attachment of the nature discussed would find instant use where it is desired to drive the tractor on a highway as where a farmer wants to take grain to a mill to be ground. If the farmer could put his grain on the side of a tractor and start off for the mill without the bother of attaching a trailer and towing a trailer along the highway, it would be a great time saver and a very convenient way of getting this service done. Then, too, an attachment of this nature would find use in supporting corn pickers, either the one row or two row type.

It is an object of the invention among others to provide a bracket and supporting attachment for a tractor that may be attached to the side of a tractor to make a supporting structure on the tractor to hold any article, articles or objects desired to be transported from place to place; a bracket and supporting attachment for a tractor that is attached directly to a tractor and becomes part of the tractor to make a transportation means of the tractor; a bracket and supporting attachment for a tractor that may be placed on either side of the tractor or on both sides and as many bracket and supporting attachments may be used on each side as desired or needed; a bracket and supporting attachment for a tractor that when mounted does not interfere in any way with a driver operating the tractor; a bracket and supporting attachment that requires no special skill to mount or disassemble the attachment; a bracket and supporting attachment that allows adjustment of the structure to fit on different types and styles of tractors; a bracket and supporting attachment that is simple in construction hence easy to manufacture and a bracket and supporting attachment that is economical in construction and durable, economical and long lasting in operation.

In carrying out the objects of the invention there is provided a bracket and support attachment for tractors comprising a vertical member having a hook attached to one side thereof which fits over the framework of a tractor to support the attachment. The vertical member may have a series of openings in the upper portion of the vertical member which openings serve to mount the hook portion adjustably on the vertical member. A screw may be threaded through the vertical member to contact the framework of the tractor to add additional support for the vertical member and level the same. A supporting member is attached to the other side of the vertical member and extends perpendicularly from the vertical member. The supporting member may be made in two pieces which pieces are adjustable relative to each other to vary the width of the supporting member. The two supporting pieces may be made adjustable relative to each other by a second piece telescoping within the other piece. An upright member may be attached to the end of the second supporting member.

The vertical member is made of substantial length so as to extend below the body portion of most makes of tractors. If a bracket and supporting attachment member are used on each side of a tractor and placed directly opposite each other, a tie bolt may pass under the tractor to secure the lower end portions of each vertical member together.

With the foregoing and other objects in view, the invention will be more fully described hereinafter and will be particularly pointed out in the claim appended hereto.

In the drawings, wherein like symbols refer to like or corresponding parts throughout the several views:

Figure 1 in an elevational view of a tractor with the bracket and support attachment on the tractor.

Figure 2 is a sectional view taken on the line 2—2 of Figure 1.

Figure 3 is an elevational view of one side of the tractor showing two bracket and support attachments attached to the tractor and fence posts being transported.

A tractor is shown at 1 that represents generally a farm tractor with channel irons 2 forming the framework of the tractor 1 to support the engine of the tractor.

The bracket and support attachment represented generally at 3 comprises a vertical member 4 being seen in Figure 2 as having a hook member 5 attached to the inside of the vertical member 4. The hook member 5 fits over channel iron 2 of the tractor to support the attachment on the tractor. The hook 5 is attached to the vertical member 4 by a bolt 6 which bolt 6 passes through one of a series of bolt openings 7. By selecting the opening 7 desired, the hook 5 can be adjusted on the vertical member 4 at any position necessary dependent upon the type tractor on which the attachment is placed.

The supporting member is made in two sections a first supporting member 8 in the form of a pipe member is attached to the outside of the vertical member 4 and extends perpendicularly from the vertical member. The supporting member 8 has a second supporting member 9 movable relative to the first supporting member 8 to vary the width of the supporting member. The second supporting member 9 telescopes within the first supporting member 8 and the first supporting member 8 has a series of openings 10 with one or more openings in the portion of the second supporting member 9 that extends into the first supporting member 8 and bolts 11 pass through the openings 10 to hold the two telescoping supporting members 8 and 9 in the adjusted position desired. The second supporting member 9 has an upright member 12 attached thereto which may be included or omitted as desired as it is screw threaded into the member 9. Running from the first supporting member 8, below the supporting member 8 to the lower portion of the vertical member 4 is a brace 13 to give reenforcement to supporting member 8. A screw 13a passes through the lower portion of the vertical member 4 and contacts channel member 2 forming the framework of tractor 1. The screw 13a acts as a leveling means for the attachment 3 and an additional securing means to secure the attachment 3 to a tractor.

Figure 3 shows two bracket and supporting attachments 3 secured on one side of a tractor 1 and the tractor 1 loaded with fence posts. In this instance, two attachments only are placed on one side of the tractor with a board, such as shown at 14, Figure 2, laid between the supporting members 8 and 9 of each attachment 3 to form a bottom and the upright members 12 forming side members to hold the posts in place. It is noted that a box member can be fit between the two attachment members 3 or another board can be put up as a side-wall resting on uprights 12. The hook 5 will hook the attachment in place and any weight whatsoever placed on the supporting member will tend to anchor it solidly in place. The attachments 3 are easy to assemble, being only a matter of hooking the hook 5 over the framework 2 and lifting it off the channel 2 when disassembly is desired. A tractor can be operated with the supporting attachment on one side only and loaded without disturbing the center of balance of the tractor 1.

If it is desired to place bracket and supporting attachments 3 on both sides of a tractor 1, it is noted that the vertical members 4 are of substantial length. The bracket and supporting attachments 3 on opposite sides of the tractor 1 are placed directly opposite each other. The lower end portion of the vertical member 4 has an opening and a tie bolt 15 extends through the openings in the bottom of the vertical members 4 of opposite attachments 3 and the two bracket and supporting attachments 3 are secured together, thus giving more rigidity to the structure and a much firmer support on the tractor 1.

While the invention has been described in connection with several specific embodiments, it is to be understood that the words which have been used are words of description rather than of limitation, and that practice of the invention within the scope of the appended claim may be resorted to without departing from the true scope of the invention in all its aspects.

I claim:

In a bracket support for tractors, a vertical member having a series of holes vertically arranged in its upper end portions, a hook member designed to fit over the framework of one side of a tractor, a bolt extending through said hook member and selectively extending through any one of said holes, a screw threaded through said vertical member from its outer side to adjustably contact the framework of said tractor for vertically adjusting said vertical member relative to the tractor to which it is designed to be attached, a second vertical member having a series of holes vertically arranged in its upper end portion, a second hook member designed to fit over the framework of the other side of the tractor, a bolt extending through said hook member and selectively extending through any one of the holes of said second vertical member, a screw threaded through said second vertical member from its outer side to adjustably contact the framework of said tractor for vertically adjusting said second vertical member relative to the tractor to which it is designed to be attached, a horizontal tubular support member rigidly secured to and extending outwardly from the outer side of each of said vertical members, a horizontal element adjustably slidably extending into each of said tubular members, a free vertical upwardly extending member on the outer end of each of said horizontal elements, a means for securing each of said horizontal elements in various positions of its movement in its respective tubular member, a means for preventing each of said horizontal elements from rotation within its respective tubular member, an elongated bolt for linking and securing the lower ends of both of said vertical members together in spaced relationship, and a brace member extending from each of said tubular members to the lower end portion of the vertical member adjacent to it; whereby a stable connected and balanced support be provided at each side of the tractor to which the device is secured.

HENRY J. KUHLMAN.

REFERENCES CITED

The following references are of record in the file of this patent:

UNITED STATES PATENTS

| Number | Name | Date |
|--------|------|------|
| 224,863 | Blessing | Feb. 24, 1880 |
| 622,278 | Nordyke | Apr. 11, 1899 |
| 751,359 | Stronach et al. | Feb. 2, 1904 |
| 1,006,994 | Barnes | Oct. 24, 1911 |
| 1,104,996 | Mc Hale | July 28, 1914 |
| 1,294,916 | Knight | Feb. 18, 1919 |
| 1,383,324 | Martell | July 5, 1921 |
| 1,562,808 | Thompson, Jr. | Nov. 25, 1925 |
| 1,587,238 | Minzoni | June 1, 1926 |
| 1,704,475 | Heinzen | Mar. 5, 1929 |
| 1,864,637 | Byrne | June 28, 1932 |
| 2,195,579 | Murdock | Apr. 2, 1940 |
| 2,425,629 | Mayer | Aug. 12, 1947 |
| 2,425,892 | Michales | Aug. 19, 1947 |

FOREIGN PATENTS

| Number | Country | Date |
|--------|---------|------|
| 663,788 | France | Apr. 15, 1929 |